H. WALKER.
Improvement in Breech-Loading Fire-Arms.

No. 131,484. Patented Sep. 17, 1872.

FIG. II   FIG. III   FIG. IV        FIG. V

FIG. VI

Witnesses,
Richard Skerrett
Henry Skerrett

Inventor
Henry Walker

2 Sheets--Sheet 2.
H. WALKER.
Improvement in Breech-Loading Fire-Arms.
No. 131,484. Patented Sep. 17, 1872.
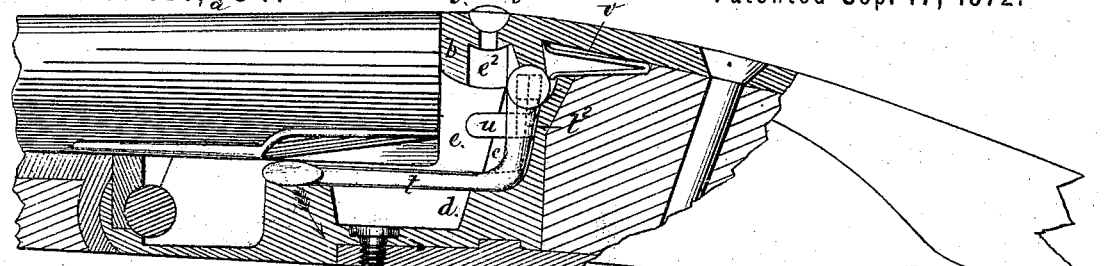
FIG. VII.
FIG. VIII
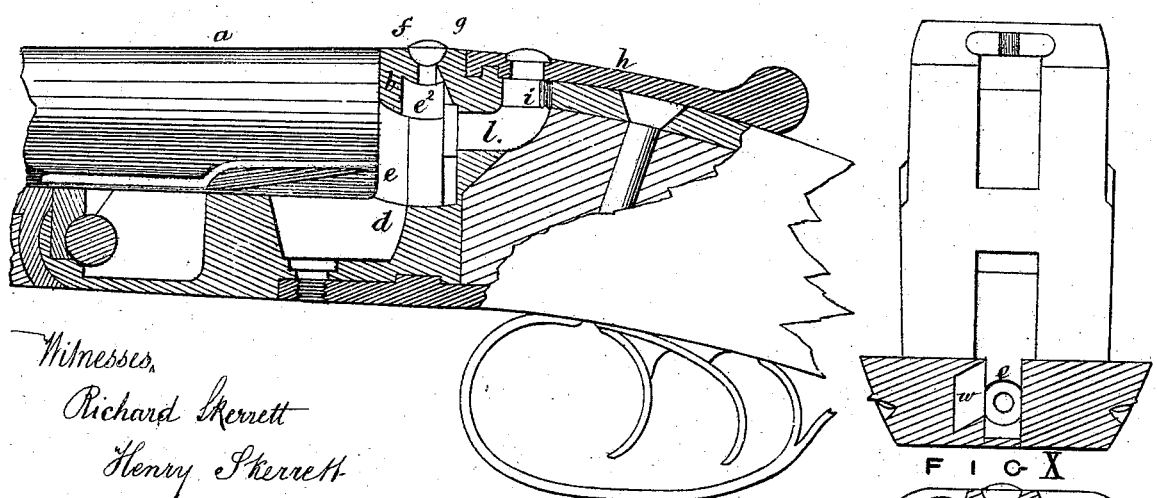
FIG. IX
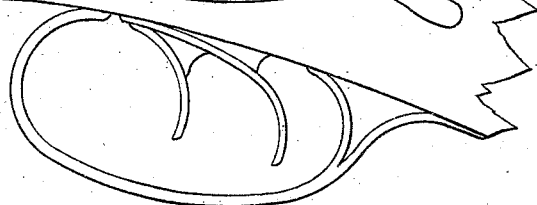
Witnesses
Richard Skerrett
Henry Skerrett
FIG. X
FIG. XI
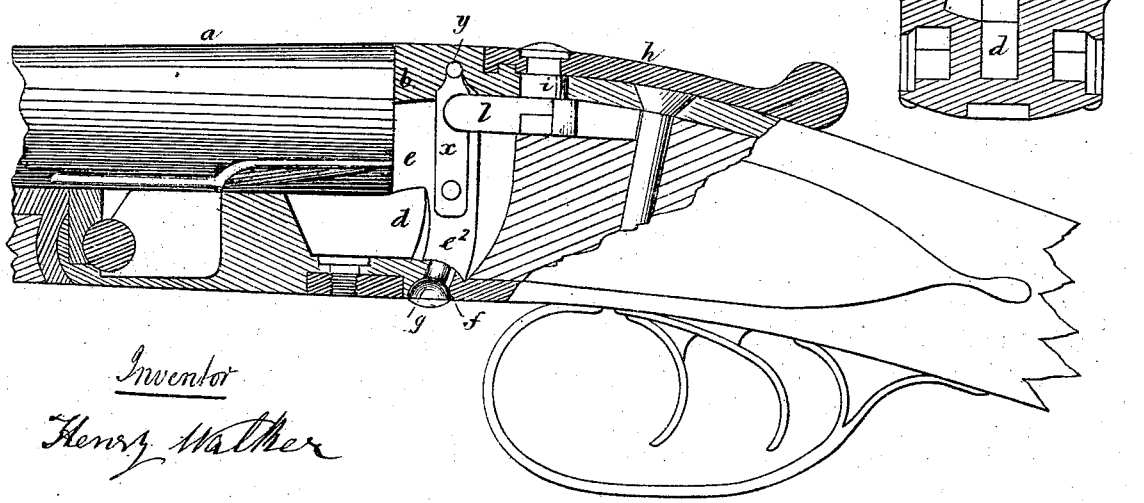
Inventor
Henry Walker

UNITED STATES PATENT OFFICE.

HENRY WALKER, OF HANDSWORTH, ENGLAND.

IMPROVEMENT IN BREECH-LOADING FIRE-ARMS.

Specification forming part of Letters Patent No. 131,484, dated September 17, 1872.

*To all whom it may concern:*

Be it known that I, HENRY WALKER, of Handsworth, in the county of Stafford, England, gun-maker, a subject of the Queen of Great Britain, have invented or discovered new and useful "Improvements in Breech-Loading Small-Arms;" and I, the said HENRY WALKER, do hereby declare the nature of the said invention, and in what manner the same is to be performed, to be particularly described and ascertained in and by the following statement thereof—that is to say:

My invention consists of the improvements hereinafter described in the construction and arrangements of the parts of drop-down small-arms for the purpose, principally, of securely fixing down the barrels of the said small-arms during discharge, and liberating the same so as to permit of the raising of the barrels for charging. The barrels are fastened down by an oscillating bolt, situated in a vertical recess in the break-off, bearing upon the upper face of the lump on the under side of the barrels. This bolt fills up the recess and its upper end bears upon a hemispherical seat at the top of the break-off, and also takes upon a curved bearing at the top of the recess in the break-off, a screw taking into the stem of the bolt. The bolt is capable of oscillating upon this screw and seat after the manner of a ball-and-socket joint. The bolt is withdrawn from the lump by means of a lever on the tang of the break-off, a projecting part on the periphery of a disk on the axis of the lever engaging in a fork or recess in an arm on the said oscillating bolt. By turning aside the lever the bolt is drawn back and the barrels released. A spring bearing on the axis of the lever effects the return motion of the lever and the snapping action of the bolt. A projecting finger or indicator on the screw upon which the bolt oscillates shows by its raised position when the barrels are not fixed down. The oscillating bolt may turn upon a center on its under side and be actuated by a lever connected directly to it, and the actuating-levers in either arrangement may turn in a vertical plane. Instead of an oscillating bolt a curved bolt may be employed.

Having explained the nature of my invention, I will proceed to describe, with reference to the accompanying drawing, the manner in which the same is to be performed.

Figure 1:
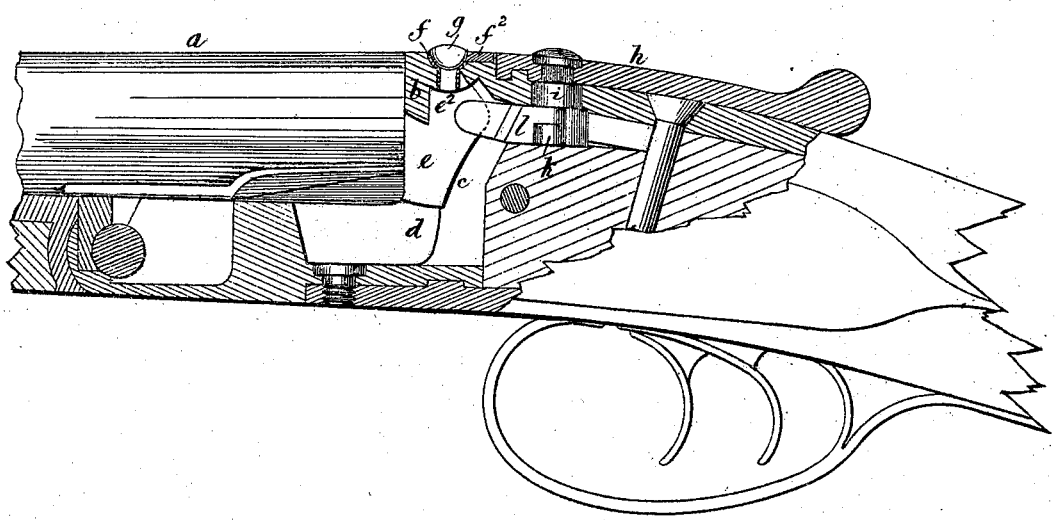
Figure 1:
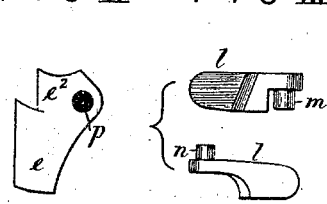
Figure 1:
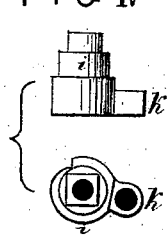
Figure 1:
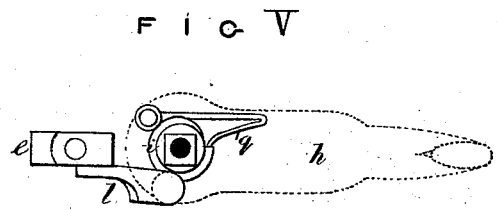
Figure 1:
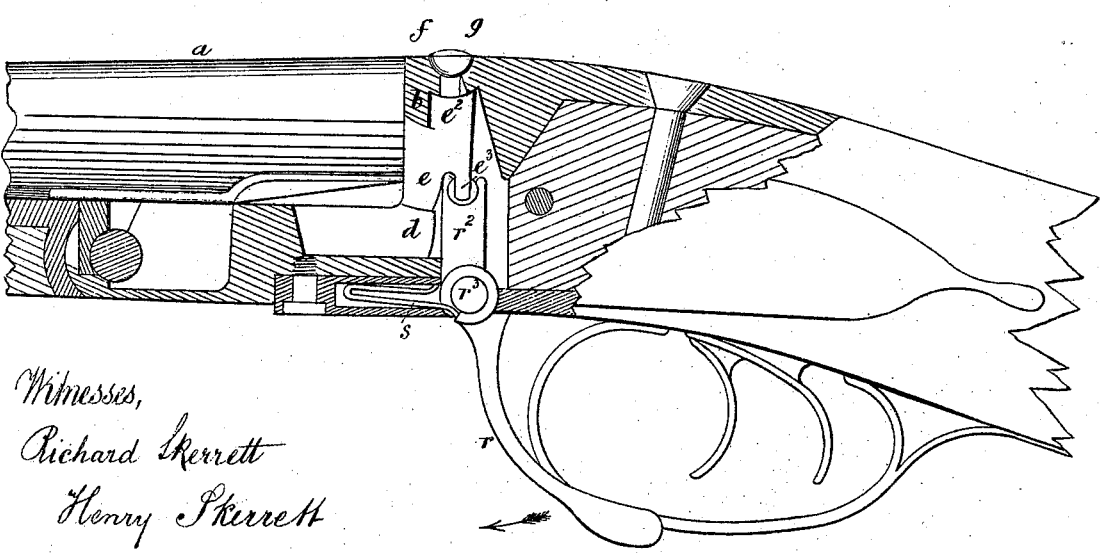

Figure 1 represents, in longitudinal vertical section, the barrels being in elevation, the breech-end of a drop-down gun, the fixing down and releasing mechanism of which is constructed and arranged according to my invention. Figs. 2, 3, 4, and 5 represent parts of the same detached, as hereinafter described.

In Fig. 1 the barrels are represented fixed down and the gun ready for discharge.

$a$ are the barrels, and $b$ is the break-off, against the face of which the breech-end of the barrels $a$ bear when shut down. In the lower part of the face of the said break-off $b$ is a recess, $c$, into which, when the barrels are shut down, a lump, $d$, on the under side of the barrels, enters, the upper face of the said lump projecting, when the barrels have reached their closed position, a short distance behind the face of the break-off, as represented in the drawing. The barrels $a$ are held down by means of the oscillating bolt $e$, the said bolt being constructed and working as hereinafter described. This bolt is represented separately in Fig. 2. The said bolt $e$ enters and fills up the recess $c$ above the projecting part of the lump $d$, the lower part of the said bolt bearing on the upper face of the said lump $d$, and the upper part of the said bolt bearing against the top of the recess in the break-off. The bolt $e$ has on its upper side and at a short distance from its acting end a vertical arm, $e^2$, which occupies a vertical hole in the break-off and parallel to its face. The said hole extends nearly but not quite to the top of the break-off. On the top of the break-off, immediately over the said hole, is a hemispherical depression or seat, $f$, at the bottom of which is a hole communicating with the before-mentioned vertical hole. A screw, $g$, having a hemispherical figure on the under side of its head, is passed through the said small hole and screwed into the vertical arm or stem $e^2$ of the bolt. The said bolt is thus capable of oscillating upon the said screw $g$ and hemispherical recess $f$, somewhat after the manner of a ball-and-socket joint. The bottom of the oscillating bolt is curved and seats itself upon the top of the curved lump $d$. The shoulder of the bolt and the top of the stem are also curved and seat themselves against curved seats made in the break-off for their reception. In some cases the hemispherical center and seat may be omitted and the oscillating bolt turn upon an axis situated across the break-off.

The oscillating bolt $e$ is operated upon so as to withdraw it from off the lump $d$ to release the barrels by the following arrangement of parts: On the tang of the break-off $b$ is a lever, $h$, the said lever turning on the vertical axis $i$, passing through the tang of the break-off at a short distance behind the bolt $e$. The lower end of the said axis $i$ has a projecting part, $k$, on its periphery. The axis $i$ is shown detached in Fig. 4. Between the axis $i$ of the lever and the bolt $e$ is a horizontal arm or link, $l$. This arm is shown separately in Fig. 3. The said arm $l$ is connected to the axis $i$ and bolt $e$, respectively, by two pins or studs, $m$ $n$. The stud $m$ is situated on the under side of one end of the arm $l$, and takes into a hole in the projecting part $k$ of the axis $i$, while the stud $n$ is situated on the side of the other end of the arm $l$ and takes into a hole, $p$, in the stem of the bolt $e$. A plan of the bolt $e$, arm $l$, axis $i$, and under side of the lever $h$ (indicated in dotted lines) is represented in Fig. 5, the parts in the said Fig. 5 occupying the respective positions of the corresponding parts in the gun, Fig. 1. A spring, $q$, bearing against a shoulder on the disk part of the axis $i$, effects the return motion of the lever $h$ and snapping action of the oscillating bolt $e$. In order to release the barrels of the gun, the lever $h$ on the tang is turned aside, or in a horizontal plane. The projecting part $k$ of the axis $i$, acting through the arm $l$, draws the bolt $e$ from off the lump $d$, the said bolt oscillating upon its seat, and the barrels are released, and their breech-ends may be raised for charging. On removing the hand from the lever $h$ the bolting-down parts take the positions represented by the action of the spring $q$. After loading the gun the shutting down of the barrels $a$ causes the lump $d$ on their under side to force back the oscillating bolt $e$, and when the said lump has reached its lowest position the said bolt snaps upon the said lump and securely fastens down the barrels, as represented in the drawing. The head of the screw $g$, upon which the bolt oscillates, may carry at its rear end a projecting finger or indicator, which, when in a raised position, shows that the barrels are not fixed down. This indicator is marked $f^2$ in Fig. 1. The front part of it is tubular, or is provided with a rib, against which the shoulder of the bolt bears. As the bolt is withdrawn the indicator is raised, and as the bolt passes to its fastening position the indicator lies flush with the top of the break-off. Instead of withdrawing the oscillating bolt $e$ from off the lump $d$ by the side motion of a lever on the tang of the gun, the said bolt may be withdrawn by means of a lever on the under side of the gun, as illustrated in Fig. 6, or by means of a lever on the side of the gun, as illustrated in Fig. 7, the said levers moving in a vertical plane. In Fig. 6 the short arm $r^2$ of the lever $r$ $r^2$ is connected with the oscillating bolt $e$ by means of a stud, $e^3$, on the bolt taking into a hole or recess in the center of the top of the said short arm. The return motion of the bolt $e$ and lever $r$ $r^2$ is effected by the spring $s$ acting against a shoulder near the axis $r^3$ of the lever $r$ $r^2$. The bolt $e$ of the gun, Fig. 6, is withdrawn by moving the thumb-plate end $r$ of the lever in the direction indicated by the arrow. In Fig. 7 the inner arm $t^2$ (indicated in dotted lines) of the lever $t$ $t^2$ is cranked, the said cranked end taking into a recess in the link $u$, connected with the bolt $e$. $v$ is the spring for giving the return motion to the lever $t$ $t^2$ and bolt $e$. The bolt is withdrawn by depressing the thumb-plate end $t$ of the lever in the direction indicated by the arrow. Fig. 8 represents, in longitudinal section, an arrangement of my invention in which the oscillating bolt $e$ works in an oblique slot in the break-off instead of in a slot situated in a plane perpendicular to the face of the break-off, as before described. Fig. 9 is a plan of the body of the gun, (partly in horizontal section,) and Fig. 10 is a transverse vertical section taken through the break-off. In this arrangement the lateral slot in the break-off, into which the bolt $e$ takes to release the barrels, is marked $w$. The parts for working the oscillating bolt $e$, Figs. 8, 9, and 10, consist of an arm, $l$, connected at one end with the bolt $e$, and at the other end with a projecting part on the axis of the lever $h$, the action of the parts being similar to those of the arrangement represented in Figs. 1, 2, 3, 4, and 5. Fig. 11 represents an arrangement of my invention in which the oscillating bolt $e$ is inverted, the said bolt turning on a pin or center, $g$, on the under side of the body of the gun. In this arrangement the arm or link $l$ of the axis $i$ of the lever $h$ is connected through a lever, $x$, with the bolt $e$, the said lever $x$ turning on the center $y$. By this means the motion of the lever $h$ on the tang through a small angle is multiplied in the bolt. The bolt $e$ of the gun, instead of oscillating on a center, as described and represented in the several figures of the drawing, may be used without a center, and be made to work in a curved recess or path in the break-off. In this modification of my invention the shank $e^2$, screw-pin $g$ and its seat, and the cross-pin or center of the bolt are omitted, and the top and bottom bearing-faces of the bolt are curved, the said curved faces being struck from the same center, the recess in the break-off having a corresponding figure. The bolt in this modification is made longer than the oscillating bolt, in order to increase its bearing-surfaces at top and bottom. The said curved bolt moves through a portion of a circle in its curved recess in the break-off to fasten and unfasten the barrels, precisely in the manner in which the oscillating bolt moves, and is worked in the same ways.

Having described my invention, what I claim, and desire to secure by Letters Patent, is—

1. In combination with the break-off and the projecting lump on the breech-end of the barrels, an oscillating or curved bolt situated in and filling a recess in the break-off, and working against the curved top, or the curved top and bottom of said recess, the bottom or lower curved face of the bolt seating itself upon the upper face of the said projecting lump, the several parts being constructed and operating together, substantially as shown and described.

2. In combination with the oscillating or curved bolt, arranged and operating as specified in the preceding clause, the means herein described for withdrawing the said bolt from the lump on the breech-end of the barrels.

3. The curved bolt, working in a recess in the break-off, as described, and taking its bearing and oscillating upon a hemispherical seat in the break-off, substantially as herein shown and set forth.

HENRY WALKER.

Witnesses:
RICHARD SKERRETT,
    7 *Cannon Street, Birmingham.*
HENRY SKERRETT,
    7 *Cannon Street, Birmingham.*